United States Patent [19]

Aoki

[11] 4,259,604
[45] Mar. 31, 1981

[54] DC ROTARY MACHINE

[75] Inventor: Kanemasa Aoki, Yokohama, Japan

[73] Assignee: Canon Kabushiki Kaisha, Tokyo, Japan

[21] Appl. No.: 942,884

[22] Filed: Sep. 15, 1978

[30] Foreign Application Priority Data

Sep. 17, 1977 [JP] Japan .................................. 52-111871

[51] Int. Cl.³ ............................................ H02K 47/04
[52] U.S. Cl. .................................... 310/113; 310/138; 310/266
[58] Field of Search ............... 310/113, 138, 266, 159, 310/44, 136, 140, 139

[56] References Cited

U.S. PATENT DOCUMENTS

| | | | |
|---|---|---|---|
| 2,717,321 | 9/1955 | Stearns | 310/138 |
| 2,758,231 | 8/1956 | Welter | 310/44 X |
| 2,860,267 | 11/1958 | Hayes | 310/266 |
| 3,870,910 | 3/1975 | Füssner | 310/44 X |
| 3,909,645 | 9/1975 | Herr et al. | 310/138 |
| 4,082,970 | 4/1978 | Girardin | 310/113 |

Primary Examiner—Donovan F. Duggan
Attorney, Agent, or Firm—Fitzpatrick, Cella, Harper & Scinto

[57] ABSTRACT

An improvement in DC rotary machine is disclosed. The stationary field yoke of the DC rotary machine has a cylindrical field member and a cylindrical bearing member of a smaller diameter than that of the field member. These members are made of oil-containing sintered alloy as a unitary member. The inner cylindrical surface of the bearing part of the stationary field yoke supports a rotary shaft rotatably therein. A motor coil assembly in a shape of cup is fixedly mounted on the rotary shaft. A generator coil assembly is also formed in a shape of cup which has a central opening in the botton wall of the cup. The diameter of the central opening is approximately equal to the outer diameter of the bearing part of the stationary field yoke. The open end of the cup like generator coil assembly is disposed in opposition to the open end of the cup like motor coil assembly and these two open ends in opposition to each other are jointed together with the interposition of an insulating element therebetween so as to form a rotary coil unit which encloses the field part of the field yoke. A commutator for generator is formed in a shape of cylinder the inner diameter of which is larger than the outer diameter of the bearing member of the field yoke and the commutator is secured to the generator coil assembly keeping a spacing between the commutator and the bearing member.

10 Claims, 5 Drawing Figures

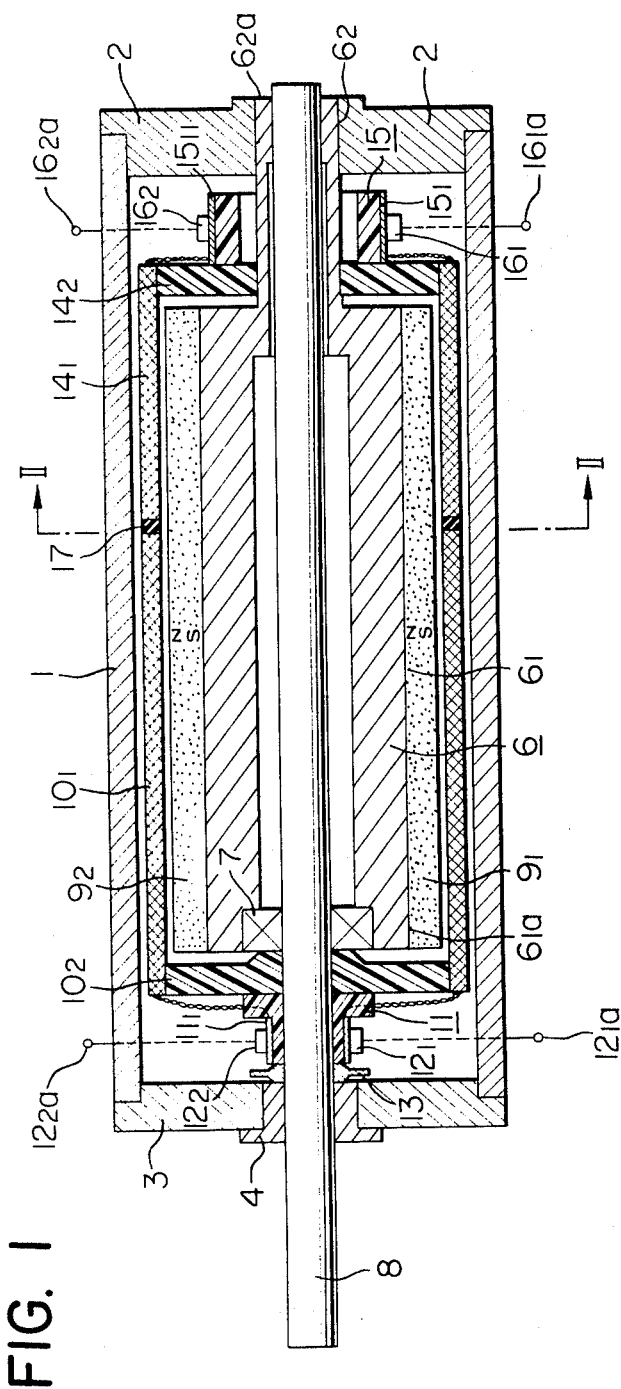
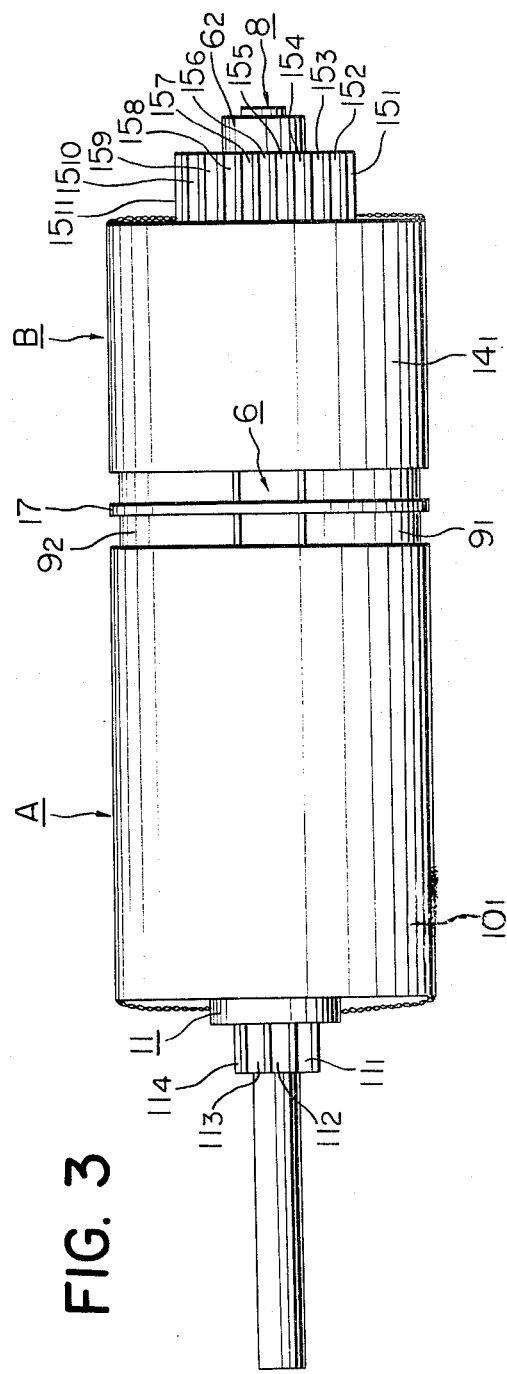
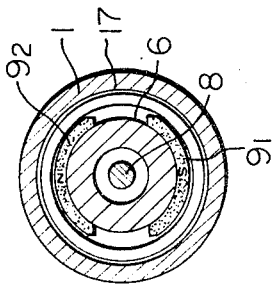
FIG. 1
FIG. 3
FIG. 2

DC ROTARY MACHINE

BACKGROUND OF THE INVENTION

1. Field of the Invention

The present invention relates to a DC rotary machine.

2. Description of the Prior Art

There is well known and widely used in the art a type of DC rotary machine comprising a first coil assembly for a motor and a second coil assembly for a generator rotating together. Such DC rotary machine is used, for example, as a rotary machine for tape recorder, VTR etc.

In use, the rotational speed of the DC rotary machine is kept constant by a speed detection and control apparatus. A DC signal representative of the rotational speed of the motor element is derived from the generator element and the DC signal is applied to, for instance, the speed detection and control apparatus. In response to the signal, the speed detection and control apparatus controls the supply of current to the motor element so as to keep the rotational speed of the DC rotary machine constant.

In almost all of the conventional DC rotary machines of the above-mentioned type, the output rotary shaft of the motor is coupled with the input rotary shaft of the generator so that the two shafts may rotate together as a unit. Such coupling between the two rotary shafts brings about a mechanical resonance by which some reduction in accuracy of the DC rotary machine may be caused.

DC rotary machines of the type pertinent to the present invention are also used in detecting, for instance, the rotational speed of a motor and controlling the speed. For this application of DC rotary machine, it is desired that a ripple wave in the wave form of the generated voltage from the generator be reduced to a minimum to attain a high accuracy of operation.

SUMMARY OF THE INVENTION

Accordingly, it is an object of the present invention to provide a DC rotary machine in which mechanical resonance is reduced as compared with the conventional machine.

It is another object of the invention to provide a DC rotary machine in which coil assemblies for the motor and generator are constructed as coreless rotary coil assemblies so as to minimize the inertia thereof.

It is a further object of the invention to provide a DC rotary machine which permits reduction of the ripple wave in the generated voltage wave form to a minimum and to assure a high accuracy in servo operation.

Still a further object of the invention is to provide a DC rotary machine of the above-mentioned type which allows reduction of the number of parts necessary therefor to make the assembly thereof very easy.

Other and further objects, features and advantages of the invention will appear more fully from the following description taken in connection with the accompanying drawings.

BRIEF DESCRIPTION OF THE DRAWINGS

FIG. 1 is a longitudinal section of a DC rotary machine showing an embodiment of the present invention;

FIG. 2 is a cross-sectional view taken along the line II—II in FIG. 1;

FIG. 3 is a side elevation of the machine shown in FIG. 1 with some parts being removed for the sake of explanation of the manner of assembly;

DESCRIPTION OF THE PREFERRED EMBODIMENTS

Figure 4:
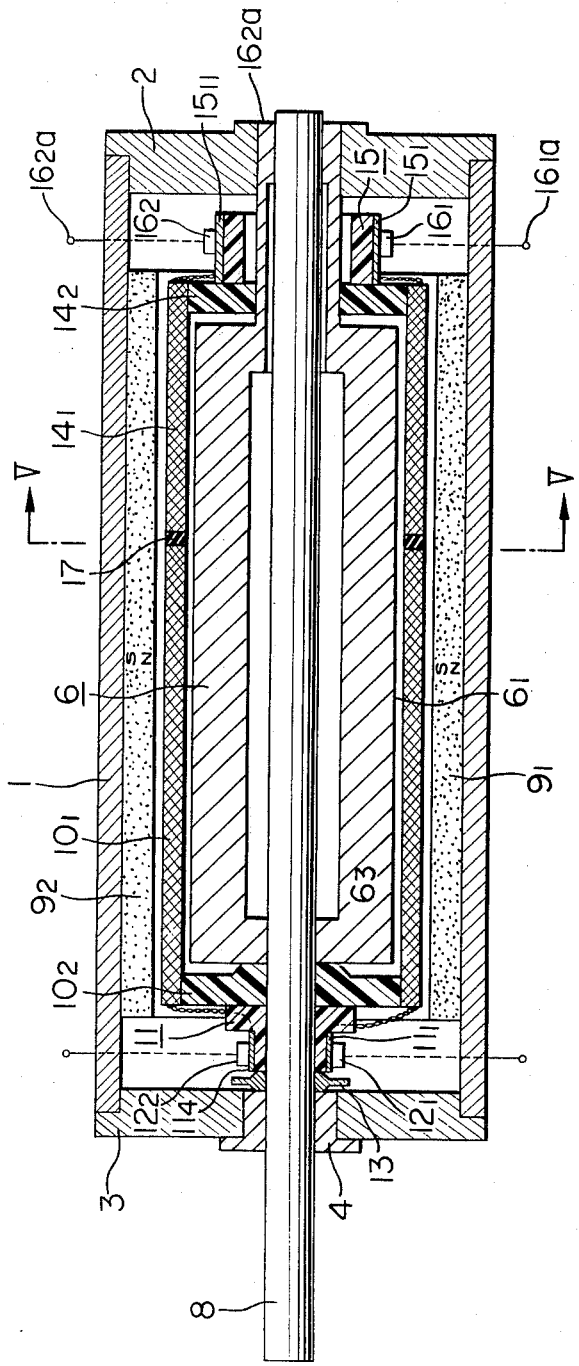
FIG. 4 is a similar view to FIG. 1 showing the second embodiment of the invention.

In FIGS. 1-3 showing the first embodiment of the invention, the reference numeral 1 designates a cylindrical outer field yoke which is made of non-magnetic material. The cylindrical outer field yoke 1 is stationary and constitutes a part of the casing of the machine. Two end openings of the outer yoke 1 are closed by cover plates (end brackets) 2 and 3 made of non-magnetic material respectively. Fixed to the cover plate 3 is a bearing metal 4 which is made of, for example, oil-containing sintered alloy and disposed coaxially with the outer yoke 1. Designated by 6 is an inner stationary field yoke in the form of a cylinder and is made of oil-containing sintered alloy of iron system. The inner cylindrical yoke 6 comprises a field member $6_1$ and a bearing member $6_2$ of a smaller outer diameter than that of the field member. The inner yoke is disposed coaxially with the outer yoke and fixed to the abovementioned cover plate 2. On the inner wall of the field member $6_1$ there is provided a bearing seat $6_1a$ to receive a bearing 7 and on the inner wall of the bearing member $6_2$ there is formed a bearing surface $6_2a$. Rotatably supported by the bearing metal 4, bearing 7 and bearing surface $6_2a$ is a rotary shaft 8. Two field permanent magnets $9_1$ and $9_2$ are secured on the circumferential surface of the inner yoke 6 at two different positions spaced by 180° from each other. The direction in which two permanent magnets $9_1$ and $9_2$ are magnetized is normal to the longitudinal axis of the inner yoke 6 but the polarity of the exposed pole surface of one permanent magnet $9_1$ is opposite to that of the other one $9_2$. Designated by $10_1$ is a coreless coil for the motor and $14_1$ is a coreless coil for the generator. These two cylindrical coreless coils are rotatably disposed within a space defined by the inner wall surface of the outer yoke 1 and the outer surfaces of the permanent magnets $9_1$, $9_2$. The coreless coil $10_1$ is fixed on the rotary shaft 8 at its one end through a coil supporting member $10_2$. The reference numeral 11 designates a cylindrical commutator having a number of commutator bars $11_1$ provided on the circumferential surface. The commutator 11 is fixedly mounted on the rotary shaft 8 and is electrically connected with the coil $10_1$. The coil $10_1$ and the coil supporting plate $10_2$ are shaped into a cup to form a coil assembly for motor A by moulding of synthetic resin material as shown in, for example, U.S. Pat. No. 3,308,319. If necessary, the commutator 11 also may be formed integrally with the motor coil assembly A. The commutator 11 is always contacted by brush elements $12_1$, $12_2$ having terminals $12_1a$, $12_2a$ outside of the yoke 1 respectively. Between the bearing metal 4 and the commutator 12 the rotary shaft 8 has an oil drain board 13 mounted thereon.

The coreless coil for the generator $14_1$ has a coil supporting plate $14_2$ fixed to one end of the coil $14_1$. The bearing member $6_2$ of the inner yoke 6 passes through a central bore $14_2a$ in the coil supporting plate $14_2$ which is rotatably supported by it. 15 is a cylindrical commutator having a number of commutator bars $15_1$ provided on the circumference of the commutator. The inner diameter of the commutator 15 is larger than the outer diameter of the bearing member $6_2$ so that the inner wall surface of the commutator can not contact the outer surface of the bearing member. The commutator 15 is fixed to the coil supporting plate $14_2$ at its one end and is electrically connected with the coil $14_1$. The coil $14_1$ and the coil supporting plate $14_2$ with the central bore $14_2a$ are shaped into a cup to form a coil assembly for generator B by moulding of synthetic resin material. Brush elements $16_1$, $16_2$ are always kept in resilient contact with the commutator to form a brush for taking up the output. Outside of the outer yoke 1, the brush elements have terminals $16_1a$, $16_2a$ respectively.

The motor coil assembly A and the generator coil assembly B are aligned with each other with the open end of the coil $10_1$ opposite to the open end of the coil $14_1$ and firmly connected with each other with the interposition of an insulating member 17 between the two coil $10_1$ and $14_1$. In this manner, the two coil assemblies A and B together form a rotary coil unit which encloses the field member $6_1$ of the inner yoke 6 and two permanent magnets $9_1$ and $9_2$ secured on the circumferential surface of the field member $6_1$.

The manner of assembly of the above described DC rotary machine will be described with reference to FIG. 3.

At first, employing the known mould forming technique of synthetic resin material, the motor coil assembly A and the generator coil assembly B are formed. In mould forming of the motor coil assembly A, the rotary shaft 8 is positioned concentrically with the coil supporting member $10_2$ and during this step of mould forming of the assembly A the rotary shaft is fixed to the assembly A making use of synthetic resin material from which the coil supporting member $10_2$ is to be formed. Thereafter, the inner yoke 6 with the bearing 7 and the permanent magnets $9_1$, $9_2$ provided thereon is fitted to the coil assembly A. Then, the generator coil assembly B is bonded to the motor coil assembly A in the manner previously described with the interposition of the insulating member 17. Finally, the bearing member $6_2$ of the inner yoke 6 is inserted into the central opening of the cover plate 2.

In the DC rotary machine with the above described structure according to the invention, the motor coil assembly A and the generator coil assembly B are bonded together through an insulating member 17 interposed between the two open ends so as to form a single rotary coil unit. The coil supporting portion of the generator coil assembly B is rotatably supported by the bearing member $6_2$ of the inner yoke 6. This structure assures a stable rotation of the rotary coil unit even when the unit (A, B) is elongated in size in the axial direction. Moreover, as previously noted, the inner diameter of the commutator 15 is larger than the outer diameter of the bearing member $6_2$ to provide a space therebetween. This space has an effect of an oil trap to prevent lubricating oil injected into the bearing member $6_2$ from flowing into the commutator bars $15_1$, $15_2$ . . . . Therefore, it is unnecessary to provide a particular oil draining means on the side of the generator coil asembly B. Because of this feature, the size in the axial direction of the rotary electric machine can be reduced substantially. On the other hand, the commutator 15 is allowed to have a larger outer diameter sufficient to provide thereon an increased number of commutator bars $15_1$, $15_2$ . . . . By increasing the number of commutator bars in this manner, it becomes possible to minimize the ripple wave in the wave form of the generated voltage from the generator coil assembly and thereby a DC rotary machine can be obtained which performs servo operation with high accuracy.

Figure 5:
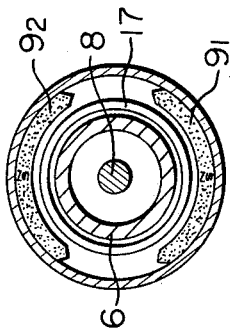
FIG. 5 is a cross-section taken along the line V—V in FIG. 4.

FIGS. 4 and 5 show a second embodiment of DC rotary machine according to the invention designed by modifying the embodiment shown in FIGS. 1 to 3. In FIGS. 4 and 5, the same reference characters and numerals as used in FIGS. 1 to 3 indicate like and corresponding parts.

The second embodiment is different from the first one in that permanent magnets $9_1$, $9_2$ are provided not on the outer cylindrical surface of the inner field yoke 6 but on the inner cylindrical surface of the outer field yoke 1 and that the bearing 7 is omitted and instead a portion $6_3$ of the yoke 6 is used as a bearing. The second embodiment has an advantage in that since the bearing 7 is omitted, the number of parts necessary for the machine can be reduce. Another advantage obtainable from the second embodiment is that the outer diameter of the rotary coil unit (A, B) can be reduced by an amount corresponding to the thickness of magnets $9_1$, $9_2$ for the same outer diameter of the outer field yoke 1 because the magnets are provided on the inner cylindrical surface of the outer yoke 1.

While the invention has been particularly shown and described with reference to preferred embodiments thereof, it will be understood by those skilled in the art that the foregoing and other changes in form and details can be made therein without departing from the spirit and scope of the invention.

What I claim is:

1. A DC rotary machine comprising:
   (a) a stationary outer field yoke made of soft magnetic material in a form of cylinder;
   (b) a stationary inner field yoke made of an oil-containing sintered alloy of iron system in the form of a cylinder disposed within said outer yoke concentrically with the latter, said inner field yoke having a field member and a bearing member of a reduced outer diameter as compared with the outer diameter of said field member, and a part of outer circumference of said bearing member being fixed on a part of said stationary outer field yoke;
   (c) a rotary shaft rotatably supported by the inner wall surface of said inner yoke;
   (d) a rotary coreless coil unit disposed within a spaced defined by the inner cylindrical surface of said outer yoke and the outer cylindrical surface of said inner yoke, said rotary coreless coil unit comprising a coil for a motor and a coil for a generator which are approximately equal in diameter and connected with each other in end-to-end fashion with the interposition of an insulating member between the two ends so as to form said single coil unit;
   (e) a first coil supporting member in the shape of a disk secured on said rotary shaft for fixedly supporting another end of said coil for the motor;
   (f) a second coil supporting member in the shape of a ring plate rotatably supported on the bearing member of said inner yoke for fixedly supporting another end of said coil for the generator;
   (g) a first commutator electrically connected with said coil for the motor;
   (h) a second commutator electrically connected with said coil for the generator;

(i) brush means for supplying electric current to said first commutator;

(j) brush means for taking up the induced voltage from said coil for the generator through said second commutator; and (k) stationary field permanent magnet means secured on said wall surface of one of said yokes.

2. A DC rotary machine as claimed in claim 1, wherein said second commutator is formed in the shape of a cylinder extending in a direction opposite to the direction in which said coil for the generator extends from the end surface of said second coil supporting member and the cylinder of said second commutator has a larger inner diameter than the outer diameter of the bearing member of said inner yoke.

3. A DC rotary machine as claimed in claim 1, wherein said permanent magnet means comprises two permanent magnets provided on the inner wall surface of said outer yoke in opposition to each other with a 180° spaced relation.

4. A DC rotary machine as claimed in claim 1, wherein said permanent magnet means comprises two permanent magnets provided on the outer wall surface of said inner yoke in opposition to each other with a 180° spaced relation.

5. A DC rotary machine comprising:
(a) a stationary outer field yoke made of soft magnetic material in the form of a cylinder;
(b) a stationary inner field yoke made of oil-containing sintered alloy of iron system in the form of a cylinder disposed within said outer yoke concentrically with the latter, said inner field yoke having a field member and a bearing member of a reduced outer diameter as compared with the outer diameter of said field member, and a part of outer circumference of said bearing member being fixed on a part of said stationary outer field yoke;
(c) a rotary shaft rotatably supported by the inner wall surface of said inner yoke;
(d) a rotary coil unit rotatable together with said rotary shaft including a rotary coil assembly for a motor and a rotary coil assembly for a generator, said rotary coil assembly for the motor comprising:
a cylindrical coil disposed within a space defined by the inner wall surface of said outer field yoke and the outer wall surface of said inner field yoke and a coil supporting member in the form of a disk extending perpendicular to the axis of said rotary shaft and fixedly mounted on said rotary shaft at a position adjacent one end surface of said inner field yoke, said coil supporting member being fixed to one end of said coil for the motor to support said coil in a cantilever fashion, and said rotary coil assembly for the generator comprising:
a cylindrical coil disposed within a space defined by the inner wall surface of said outer field yoke and the outer wall surface of said inner field yoke, said cylindrical coil for the generator having a diameter approximately equal to that of said coil for the motor and one open end of said coil for the generator being firmly connected with the free open end of said coil for the motor through insulating means and a coil supporting member in the form of a ring plate extending perpendicular to the axis of said rotary shaft and rotatably supported on the bearing part of said inner field yoke at a position adjacent to the other end surface of said inner yoke, said coil supporting member being firmly connected with the other open end of said coil for the generator;
(e) a commutator for said motor coil assembly electrically connected with said coil for the motor;
(f) a commutator for said generator coil assembly electrically connected with said coil for the generator;
(g) brush means for supplying electric current to said commutator for the motor coil assembly;
(h) brush means for taking up the induced voltage from said coil for the generator through said commutator for the generator coil assembly; and
(i) stationary field permanent magnet means secured on said wall surface of one of said yokes.

6. A DC rotary machine as claimed in claim 5, wherein said commutator for the generator coil assembly is formed in the shape of a cylinder extending in a direction opposite to the direction in which said coil for the generator extends from the end surface of said coil supporting member of said generator coil assembly and said commutator for the generator coil assembly has an inner diameter larger than the outer diameter of said bearing member of the inner yoke.

7. A DC rotary machine as claimed in claim 5, wherein said permanent magnet means comprises two permanent magnets provided on the inner wall surface of said outer yoke in opposition to each other with a 180° spaced relation.

8. A DC rotary machine is claimed in claim 5, wherein said permanent magnet means comprises two permanent magnets provided on the outer wall surface of said inner yoke in opposition to each other with a 180° spaced relation.

9. A DC rotary machine comprising;
(a) a stationary outer field yoke made of soft magnetic material in a form of cylinder;
(b) bracket means comprising a first end bracket fixed to one end opening portion of said outer yoke in such manner as to close said opening and a second end bracket fixed to the other end opening portion of said outer yoke in such manner as to close said opening;
(c) a stationary inner field yoke made of oil-containing sintered alloy of iron system in the form of a cylinder disposed within said outer yoke concentrically with the latter, said inner field yoke having a field member and a bearing member of a reduced outer diameter as compared with that of the field member and being supported in a cantilever fashion by said first end bracket to which said bearing is secured, and a part of the outer circumference of said bearing member being fixed on a part of said stationary outer field yoke;
(d) bearing means fixed to said second end bracket concentrically with said outer yoke;
(e) stationary field permanent magnet means provided on the outer wall surface of said inner yoke;
(f) bearing means provided on said second end bracket concentrically with said outer yoke;
(g) a rotary shaft rotatably supported by said bearing means of said inner yoke and said bearing means;
(h) a cylindrical coreless rotary coil unit rotatably disposed in a space provided between the inner wall surface of said outer yoke and said permanent magnet means and comprising a motor coil element and a generator coil element of approximately equal diameter jointed together in an end-to-end fashion with the interposition of an insulating member therebetween so as to form said single coil unit;

(i) a first coil supporting member in a form of disk fixedly mounted on said rotary shaft for supporting the other end portion of said motor coil element;

(j) a second coil supporting member in a form of ring plate rotatably supported on the bearing means of said inner yoke for supporting the other end portion of said generator coil element;

(k) a first commutator in a form of cylinder extending in a direction opposite to the direction in which said motor coil element extends from said first coil supporting member and mounted on said rotary shaft, said first commutator being electrically connected with said motor coil element;

(l) a second commutator in a form of cylinder extending in a direction opposite to the direction in which said generator coil element extends from said second coil supporting member, said second commutator being electrically connected with said generator coil element and having an inner diameter larger than the outer diameter of the bearing part of said inner yoke;

(m) brush means for supplying electric current to said first commutator; and (n) brush means for taking up the induced voltage from said generator coil element through said second commutator.

10. A DC rotary machine comprising:

(a) a stationary outer field yoke made of soft magnetic material in a form of cylinder;

(b) bracket means comprising a first end bracket fixed to one end opening portion of said outer yoke in such manner as to close said opening and second end bracket fixed to the other end opening portion of said outer yoke in such manner as to close said opening;

(c) a stationary inner field yoke made of oil-containing sintered alloy of iron system in the form of a cylinder disposed within said outer yoke concentrically with the latter, said inner field yoke having a field member and a bearing member of a reduced outer diameter as compared with that of the field member and being supported in a cantilever fashion by said first end bracket to which said bearing is secured, and a part of the outer circumference of said bearing member being fixed on a part of said stationary outer field yoke;

(e) stationary field permanent magnet means provided on the inner wall surface of the field member of said outer yoke;

(f) bearing means provided on said second end bracket concentrically with said outer yoke;

(g) a rotary shaft rotatably supported by said bearing member of said inner yoke and said bearing means;

(h) a cylindrical coreless rotary coil unit rotatably disposed in a space provided between the outer wall surface of said inner yoke and said permanent magnet means and comprising a motor coil and a generator coil of approximately equal diameter jointed together in an end-to-end fashion with the interposition of an insulating member therebetween so as to form said single coil unit;

(i) a first coil supporting member in the form of a disk fixedly mounted on said rotary shaft for supporting the other end of said motor coil;

(j) a second coil supporting member in a form of ring plate rotatably supported on the bearing member of said inner yoke for supporting the other end portion of said generator coil;

(k) a first commutator in the form of a cylinder extending in a direction opposite to the direction in which said motor coil extends from said first coil supporting member and mounted on said rotary shaft, said first commutator being electrically connected with said motor coil;

(l) a second commutator in the form of a cylinder extending in a direction opposite to the direction in which said generator coil extends from said second coil supporting member, said second commutator being electrically connected with said generator coil and having an inner diameter larger than the outer diameter of the bearing member of said inner yoke;

(m) brush means for supplying electric current to said first commutator; and (n) brush means for taking up the induced voltage from said generator coil through said second commutator.

* * * * *